United States Patent [19]
Park

[11] Patent Number: 5,806,562
[45] Date of Patent: Sep. 15, 1998

[54] FLUID FILL APPARATUS FOR BLEEDING AIR FROM A RESERVOIR

[75] Inventor: Sae-Won Park, Kyungnam-Do, Rep. of Korea

[73] Assignee: Hyundai Motor Co., Ltd., Seoul, Rep. of Korea

[21] Appl. No.: 679,142

[22] Filed: Jul. 12, 1996

[30] Foreign Application Priority Data

Jul. 19, 1995 [KR] Rep. of Korea ..................... 95-21137

[51] Int. Cl.⁶ .................................................. E03B 11/00
[52] U.S. Cl. ............................ 137/571; 188/352; 285/332
[58] Field of Search ........................... 137/571; 188/352; 215/44; 222/189.1; 285/332, 354

[56] References Cited

U.S. PATENT DOCUMENTS

| | | |
|---|---|---|
| 1,830,674 | 11/1931 | Peck . |
| 2,055,096 | 9/1936 | Dehn et al. .......................... 222/189.1 |
| 2,625,267 | 1/1953 | Alexander ............................... 188/352 |
| 2,712,458 | 7/1955 | Lipson .................................... 285/354 |
| 3,855,997 | 12/1974 | Sauer ....................................... 215/44 |
| 4,842,107 | 6/1989 | Buchanan et al. ...................... 188/352 |

FOREIGN PATENT DOCUMENTS 58-133949 (A) 8/1983 Japan ..................................... 188/352

Primary Examiner—Denise L. Ferensic
Assistant Examiner—John Ball

[57] ABSTRACT

A fluid fill apparatus for bleeding air from a fluid reservoir includes a fluid tank and a connecting member. The fluid tank has an inlet and an outlet, and the connecting member has a first and second end. The first end is connected to the fluid tank, and the second end is connected to the fluid reservoir. The connecting member also has a fluid passage from the first end to the second end. The first end has a first orifice therein which a user causes to selectively communicate with the outlet such that fluid flows into said fluid passage, and the second end has a second orifice such that fluid in the fluid passage flows into the reservoir.

21 Claims, 2 Drawing Sheets

FLUID FILL APPARATUS FOR BLEEDING AIR FROM A RESERVOIR

BACKGROUND OF THE INVENTION

1. Field of the Invention

The present invention relates to a fluid fill apparatus for bleeding air from a reservoir and, more particularly, to an improved apparatus for bleeding air from a reservoir.

2. Description of Related Art

Various types of oil fill apparatuses for bleeding brake air are known in the art. Generally, brake air is bled when the brake oil is changed. Thus, the procedure is as follows:

First, the user separates the reservoir cap from the reservoir; second, the user connects one end of a vinyl tube to a bleeder screw of a wheel cylinder, and puts the other end of the vinyl tube into a brake oil tank; third, the user applies the brake pedal several times; fourth, the user opens the bleeder screw until the brake oil is drained out while at the same time the user pushes the brake pedal and closes the bleeder screw; fifth, the user repeats the third and fourth steps until air bubbles disappear; and sixth, the bleeder screw is screwed on.

Thus, when bleeding of brake air is completed, the brake oil fills up the reservoir continuously because of a shortage of brake oil in the reservoir. Under conventional methods, the brake oil is filled at all times by using an oil gun or by using an auxiliary oil container, which is attached to the main oil tank by a rubber band.

However, such conventional methods create a number of problems. For example, because it is necessary to keep the reservoir filled with brake oil at all times, bleeding the brake air is repeatedly conducted when the brake oil is exhausted by mistake. Also, it is easier for contaminated brake oil to reach the body frame or other parts. Furthermore, if an auxiliary oil container is utilized, it is easy for brake oil to leak, such that the proper volume of brake oil is not supplied to the oil tank, particularly when a large volume of brake oil leaks. Therefore, the risk of unnecessarily repeating the brake air bleeding operation exists.

Generally, metal corrosion takes place when there is ±0.1–0.4 mg/cm² of quantitative change at a temperature of 100° C. for 120±2 hours, and oxidation takes place when there is ±0.5–0.3 mg/cm² of quantitative change at the above conditions. Accordingly, serious surface corrosion of the parts of a vehicle can occur when they are coated with contaminated brake oil.

SUMMARY OF THE INVENTION

Accordingly, it is an object of the present invention to provide a fluid fill apparatus for bleeding air, which eliminates the above problems encountered with conventional oil fill apparatuses.

Still another object of the present invention is to provide an oil fill apparatus for bleeding brake air which is simple in structure, inexpensive to manufacture, durable in use, and refined in appearance.

These and other related objects are achieved by providing a fluid fill apparatus for bleeding air from a fluid reservoir including a fluid tank and a connecting member. The fluid tank has an inlet and an outlet, and the connecting member has a first and second end. The first end is connected to the fluid tank, and the second end is connected to the fluid reservoir. The connecting member also has a fluid passage from the first end to the second end. The first end has a first orifice therein which a user causes to selectively communicate with the outlet such that fluid flows into said fluid passage, and the second end has a second orifice such that fluid in the fluid passage flows into the reservoir.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only and, thus, are not limitative of the present invention and wherein.

DETAILED DESCRIPTION OF THE PREFERRED EMBODIMENTS

Figure 1:
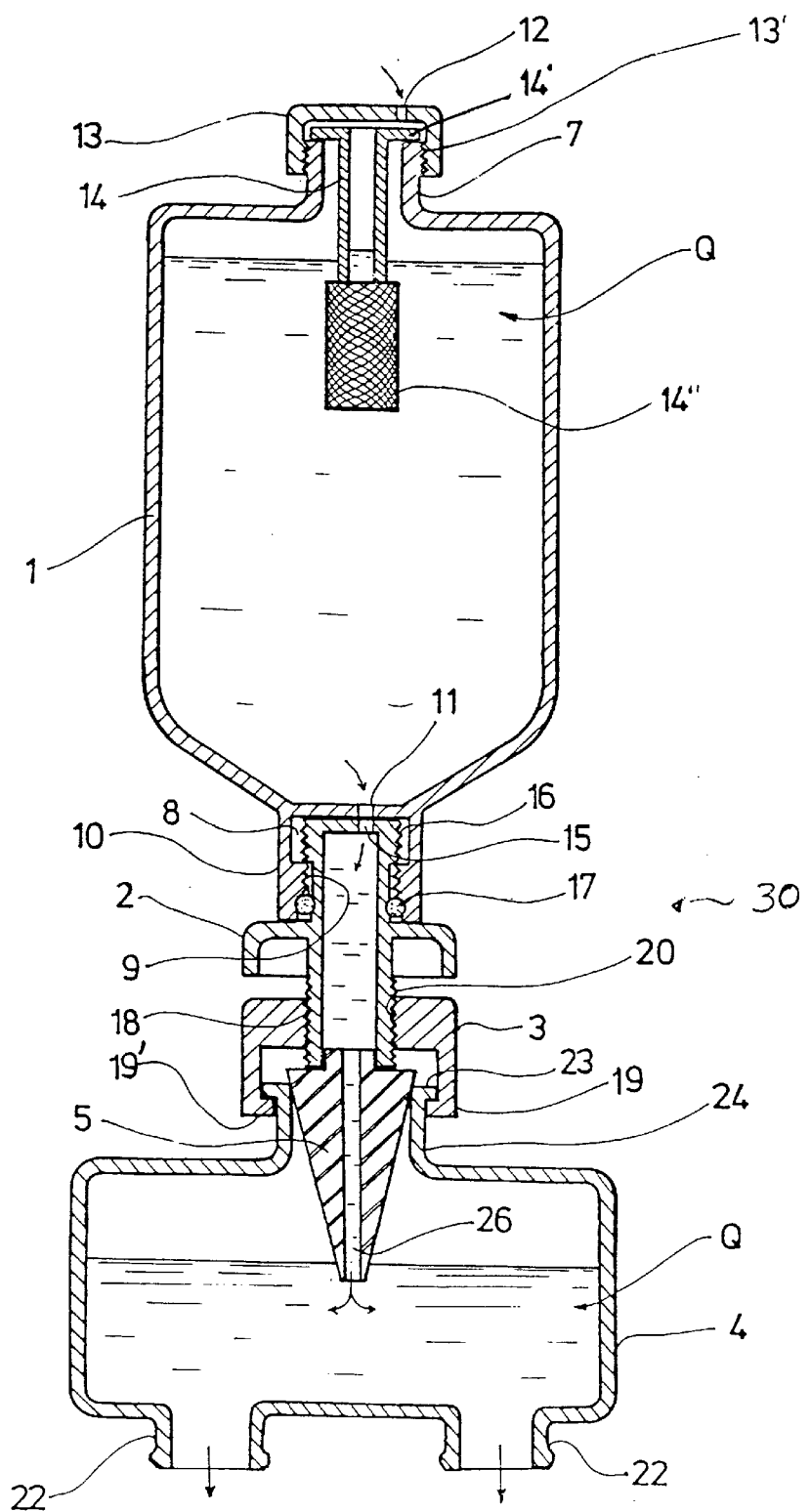
FIG. 1 is a sectional view of an oil fill apparatus for bleeding brake air according the present invention.
Figure 2:
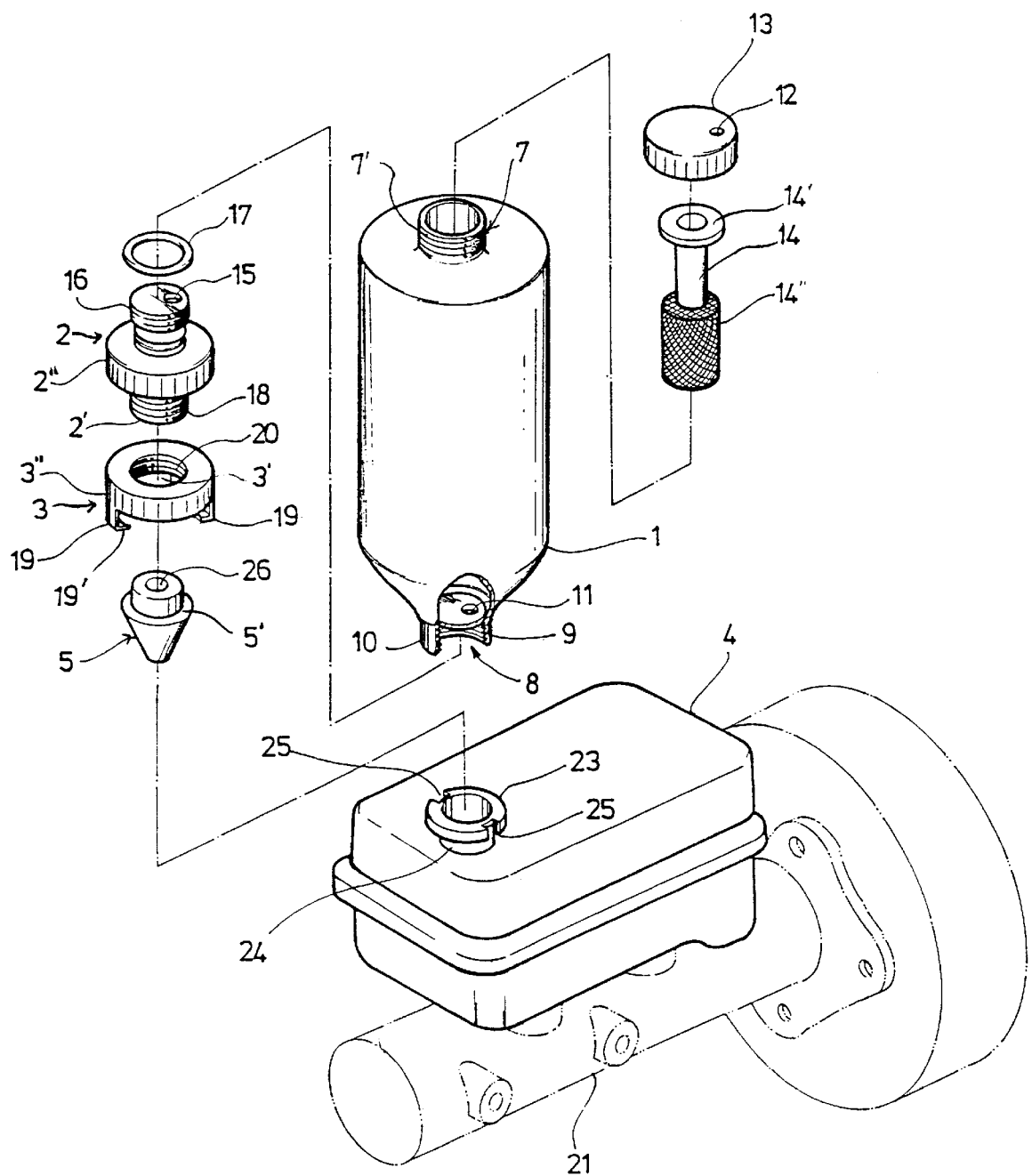
FIG. 2 is an exploded perspective view of the oil fill apparatus for bleeding brake air according to the present invention.

Referring now, in detail, to the drawings for the purpose of illustrating preferred embodiments of the present invention, the oil fill apparatus for bleeding brake air, as shown in FIGS. 1 and 2, will be described. As shown in FIGS. 1 and 2, the oil fill apparatus includes an oil tank member 1, a cap member 13 covering a top portion of the oil tank member 1, a connecting member 30 fixed to a bottom portion of the tank member 1, and a reservoir member 4 fixed to the connecting member 30 and fixed to a conventional master cylinder 21 of a vehicle.

The oil tank member 1 includes an inlet oil tank neck 7 having a neck screw 7' and an outlet oil tank neck 10 having an empty revolution space 8 and a screw surface 9. Both the empty revolution space 8 and the screw surface 9 are disposed in the interior of the screw neck 10. An oil outlet 11 is eccentrically disposed on the bottom of the oil tank member 1 for communicating with the empty revolution space 8.

The cap member 13 having a cap screw 13' engaged with the neck screw 7' of the inlet oil tank neck 7 includes an air inlet 12 disposed on the top thereof. A tube 14 having a tube flange 14' is disposed in the inlet oil tank neck 7. The tube 14 has an oil filter 14" which envelops an end portion of the tube flange 14 and filters impurities in the brake oil Q when the brake oil Q flows through the tube 14 into the oil tank member 1.

The connecting member 30 includes a screwing cap 2, a locking cap 3 engaged with the screwing cap 2, and a cone-shaped rubber cap or supply guide 5 operatively connected to both the screwing and locking caps 2 and 3.

The screwing cap 2 includes a screwing cap tube 2' having an upper screw 16, a handle band 2" (see FIG. 2), and a lower screw 18. An oil inlet 15 is eccentrically disposed in the top of the cap tube 2' and matches the oil outlet 11 of the oil tank member 1. The upper screw 16 of the screwing cap 2 engages with the screw surface 9 of the outlet neck 10, and projects into the empty revolution space 8. Also, the upper screw 16 of the screwing cap 2 is provided with an oil ring 17 (i.e., a seal) which is tightly secured with the interior of the outlet neck 10 (see FIG. 2).

The locking cap 3 contains a locking cap tube 3' having a screw surface 20 for engaging with the lower screw 18 of the screwing cap 2. The locking cap 3 also includes a handle 3" disposed on the outer surface thereof, and a pair of hooks 19 symmetrically extended from the bottom end thereof. The hooks 19 have an inwardly bending end 19'.

The conventional reservoir 4 having a conventional reservoir cap (not shown) is fixed on the master cylinder 21 for supplying the brake oil Q into the master cylinder 21. The reservoir 4 includes a pair of supplying outlets 22 disposed on the bottom thereof, a reservoir neck 24 having a reservoir neck flange 23. As shown, the supplying guide 5 is disposed in the reservoir neck 24. The reservoir neck flange 23 has a pair of slits 25 for slidably receiving the pair of hooks 19 of the locking cap 3

The supplying guide 5 has a cone-shaped configuration and is made of rubber. Also, the supplying guide 5 contains a vertical aperture 26 for communicating with the screwing cap tube 2' of the screwing cap 2 and the reservoir 4. Furthermore, the supply guide 5 includes a ring seat 5' for seating the end of the screwing cap tube 2' of the screwing cap 2. The supplying guide 5 functions in a sealing role. The screwing cap 2 is screwed downward and pushes the top of the supplying guide 5, such that the cone-shaped supplying guide 5 forcibly seals the reservoir neck 24.

The oil fill apparatus for bleeding air according to the present invention is assembled and operates as follows:

First, after the brake oil fills up the reservoir 4 to a certain level as shown in FIG. 1, the supplying guide 5 is inserted into the reservoir neck 24.

As shown in FIG. 1, the screwing cap 2 is screwed into the outlet neck 10 of the oil tank member 1 with the oil ring 17 until the screwing cap tube 2' projects into the empty revolution space 8 as shown in FIG. 1. Thereafter, the locking cap 3 is engaged with the screwing cap 2 by screwing the lower screw 18 of the screwing cap 2 into the locking cap screw surface 20 using the handle band 2" and the handle 3". Accordingly, the oil tank member 1 with the screwing and locking caps 2 and 3 is positioned on the reservoir 4 with the supplying guide 5. After the pair of hooks 19 of the locking cap 3 are inserted into a pair of slits 25 in the reservoir neck 24. When the user rotates the handle 3" to the left or right, and the pair of bending ends 19' lock in the flange 23 of the reservoir neck 24.

Thereafter, when the user rotates the screwing cap 2 in a clockwise direction, the lower screw 18 is screwed into the screw surface 20 of the locking cap 3. Accordingly, the end of the screwing cap tube 2' pushes down on the top of the supplying guide 5 and finally, the screwing and locking caps 2 and 3 and the supplying guide 5 tightly connect to the reservoir neck 24 of the reservoir 4.

In operation, after assembly is completed, the user opens the cap member 13 and fills the oil tank member 1 with brake oil Q through the oil filter 14" of the cap member 13.

Next, the user rotates the oil tank member 1 so that the oil outlet 11 thereof communicates with the oil inlet 15 of the screwing cap 2, and the brake flows into the screwing cap tube 2' due to atmospheric pressure. Thereafter, the brake oil Q flows into the vertical aperture 26 of the supplying guide 5 due to atmospheric pressure. Thus, when the brake oil Q flows into the screwing cap tube 2' and the vertical aperture 26 of the supplying guide 5, the air stored in the screwing cap tube 2' and the vertical aperture 26 moves up to the level of the brake oil Q in the oil tank member 1 as air bubbles.

The level of brake oil Q in reservoir 4 does not increase, due to Torricelli's vacuum acting thereon. Accordingly, only when the brake oil Q exhausts due to the movement of the master cylinder 21, does the brake oil Q stored in the oil tank member 1 flow into the reservoir 4 to bleed brake air.

After the brake air has been bled through operation of the master cylinder 21, the user rotates the oil tank member 1 so that the oil outlet 11 no longer communicates with the oil inlet 15. Therefore, the brake oil Q will not flow from the oil tank member 1 into the reservoir 4.

In disassembling, in contrast to the assembling sequence, the oil tank member 1 with the screwing cap 2 is separated from the locking cap 3 by rotating the locking cap 3 in the counter clockwise direction. Thereafter, a conventional reservoir cap is used to cover the reservoir neck 24 of the reservoir 4.

Accordingly, the oil fill apparatus for bleeding air according to the present invention has a number of advantages. For instance, the apparatus is easy to assemble or disassemble. Furthermore, the seal between parts is tight and there is no likelihood of brake oil leaking during operation or separation of the oil tank member 1 from the connecting member 30. Also, the bleeding operation is quick and eliminates the possibility of corrosion.

The invention being thus described, it will be obvious that the same may be varied in many ways. Such variations are not to be regarded as a departure from the spirit and scope of the invention, and all such modifications as would be obvious to one skilled in the art and are intended to be included in the scope of the following claims.

What is claimed is:

1. A fluid fill apparatus for bleeding air from a fluid reservoir, comprising:

a fluid tank having an inlet and an outlet;

a connecting member having a first and second end, said first end connected to said fluid tank, and said second end connected to said fluid reservoir, said connecting member having a fluid passage from said first end to said second end, said first end having a first orifice therein which a user causes to selectively one of communicate with said outlet such that fluid flows into said fluid passage and not communicate with said outlet such that fluid does not flow into said fluid passage while connected to said fluid tank, and said second end having a second orifice such that fluid in said fluid passage flows into said reservoir.

2. The apparatus of claim 1, wherein said connecting member comprises:

a first cylindrical cap having a first and second end, said first end of said first cylindrical cap forming said first end of said connecting member;

a second cylindrical cap having a first and second end, said first end of said second cylindrical cap connected to said second end of said first cylindrical cap connected to said second end of said first cylindrical cap, and said second end of said second cylindrical cap connected to said reservoir; and a conical member having a base and a tip, said base of said conical member being disposed in said second cylindrical cap such that said base contacts said second end of said first cylindrical cap, and said tip being disposed in said reservoir, said conical member having a fluid passage from said base to said tip, an interior of said first and second cylindrical caps and said fluid passage of said conical member forming said fluid passage of said connecting member, and said tip having said second orifice formed therein.

3. The apparatus of claim 2, wherein:

said fluid tank includes a tank neck extending from said outlet; and an exterior of said first end of said first cylindrical cap engages an interior of said tank neck.

4. The apparatus of claim 3, further comprising:

a ring seal disposed between said exterior of said first end of said first cylindrical cap and said interior of said tank neck.

5. The apparatus of claim 2, wherein said first cylindrical cap includes a flange around a middle portion thereof.

6. The apparatus of claim 5, wherein a user rotates said first cylindrical cap using said flange so that said orifice in said first end of said first cylindrical cap communicates with said orifice in said second end of said fluid tank.

7. The apparatus of claim 3, wherein a user rotates said first cylindrical cap so that said orifice in said first end of said first cylindrical cap communicates with said orifice in said second end of said fluid tank.

8. The apparatus of claim 3, wherein said tank neck includes a first and second portion, said first portion being disposed closer to said fluid tank, an interior of said second portion engages said exterior of said first end of said first cylindrical cap, and an interior of said second portion having a smaller circumference than said interior of said first portion such that a gap is formed between said interior of said first portion and said exterior of said first end of said first cylindrical cap.

9. The apparatus of claim 2, wherein said second cylindrical cap includes a flange around a middle portion thereof.

10. The apparatus of claim 2, wherein an exterior of said second end of said first cylindrical cap engages an interior of said first end of said second cylindrical cap.

11. The apparatus of claim 10, wherein said conical member includes an annular projection on said base, said annular projection projecting into and engaging said second end of said first cylindrical cap.

12. The apparatus of claim 2, wherein said conical member includes an annular projection on said base, said annular projection projecting into and engaging said second end of said first cylindrical cap.

13. The apparatus of claim 2, wherein said conical member is made of rubber.

14. The apparatus of claim 2, wherein said reservoir includes a neck having an annular projection disposed around a circumference thereof, and said annular projection includes at least two slits therein; and said second end of said second cylindrical cap includes at least two radial projections, associated with said slits, projecting towards an interior of said second cylindrical cap, said second cylindrical being connected to said reservoir by disposing said second cylindrical member such that said radial projections fit through said slits and rotating said second cylindrical member such that said radial projection lock against said annular projection on said reservoir neck.

15. The apparatus of claim 2, wherein:

said reservoir includes a reservoir neck;

said conical member being disposed in said reservoir neck such that an outer conical surface thereof contacts said reservoir neck; and said second end of said first cylindrical cap is rotationally engaged with said first end of said second cylindrical cap such that rotational engagement can be increased to exert a greater contact force on said conical member via said second end of said first cylindrical cap to increase the contact force between the conical member and the reservoir neck.

16. The apparatus of claim 1, further comprising:

an inlet tube disposed in said fluid tank via said inlet, said inlet tube having a fluid filter disposed on one end.

17. The apparatus of claim 16, further comprising:

a cover for covering said inlet.

18. The apparatus of claim 1, wherein said reservoir and said fluid tank store oil.

19. The apparatus of claim 1, wherein said connecting member is rotated so that said orifice in said first end thereof aligns with said outlet.

20. The apparatus of claim 19, wherein said orifice in said first end of said connecting member and said outlet are positioned eccentrically.

21. The apparatus of claim 2, wherein said tip of said conical member extends past said second end of said second cylindrical cap.

* * * * *